US010822236B2

(12) United States Patent
Lee et al.

(10) Patent No.: US 10,822,236 B2
(45) Date of Patent: Nov. 3, 2020

(54) METHOD OF MANUFACTURING CARBON NANOTUBES USING ELECTRIC ARC DISCHARGE (71) Applicant: INDUSTRY-ACADEMIA COOPERATION GROUP OF SEJONG UNIVERSITY, Seoul (KR)

(72) Inventors: Nae Sung Lee, Seoul (KR); Tae Hun Shin, Goyang-si (KR)

(73) Assignee: INDUSTRY-ACADEMIC COOPERATION GROUP OF SEJONG UNIVERSITY (KR)

( * ) Notice: Subject to any disclaimer, the term of this patent is extended or adjusted under 35 U.S.C. 154(b) by 0 days.

(21) Appl. No.: 16/362,599

(22) Filed: Mar. 22, 2019

(65) Prior Publication Data
US 2019/0292058 A1 Sep. 26, 2019

(30) Foreign Application Priority Data

Mar. 23, 2018 (KR) .......... 10-2018-0033650
Mar. 20, 2019 (KR) .......... 10-2019-0031528

(51) Int. Cl.
C01B 32/16 (2017.01)
(52) U.S. Cl.
CPC .......... C01B 32/16 (2017.08); C01B 2202/20 (2013.01)
(58) Field of Classification Search
None
See application file for complete search history.

(56) References Cited

U.S. PATENT DOCUMENTS

2004/0168904 A1* 9/2004 Anazawa ............... B82Y 30/00
204/164

FOREIGN PATENT DOCUMENTS

JP   3998241 B2   10/2007
JP   4391780 B2   12/2009
KR   100335382 B1   5/2002

OTHER PUBLICATIONS

Shin, Tae Hun, "High Performance Field Emitters of Carbon Nanotubes Grown by Optimizing Gas Composition in Arc Discharge", Department of Nanotechnology and Advanced Materials Engineering, Feb. 2019.
Shin, Taehun et al., "Arc Discharge Growth and Field emission application of Highly crystalline carbon nanotubes", 24th Nanotube Workshop, Jan. 17, 2019, p. 33.
Shin, Taehun et al., "Arc Discharge Synthesis of Multiwalled Carbon Nanotubes by Varying Oxygen/nitrogen Gas Ratio and Their Field Emission Characteristics", Nano Korea 2018, Jul. 11, 2018, p. 1802_07.
Shin, Taehun et al., "Arc Discharge synthesis of Multiwalled Carbon Nanotubes by Varying Oxygen Gas Pressure", Korean Carbon Society, Jan. 25, 2018.
(Continued)

Primary Examiner — Kishor Mayekar
(74) Attorney, Agent, or Firm — Renaissance IP Law Group LLP (57) ABSTRACT Disclosed is a method for producing CNTs by an electric arc discharge method. The synthesis gas for the arc discharge includes nitrogen and oxygen gases. The oxygen gas in the synthesis gas is converted to reactive oxygen species by the arc discharge and chemically reacts with amorphous carbon. Accordingly, the formation of amorphous carbon is suppressed when CNTs are formed on the cathode, and thus, high crystallinity of CNTs can be secured.

11 Claims, 7 Drawing Sheets (56) References Cited

OTHER PUBLICATIONS

Shin, Taehun et al., "Field Emission Performance of Highly Crystalline carbon nanotubes", The 10th Japan-Korea Vacuum Nanoelectronics Symposium, Oct. 12, 2018.
Shin, Taehun et al., "Field Emitters of Carbon Nanotubes Grown by Electric Arc Discharge", Field Emission Workshop 2018, Nov. 15, 2018.
Shin, Taehun et al., "High Performance Field Emitters of Carbon Nanotubes Grown by Optimizing Gas Composition in Arc Discharge", 2018 KIEEME Annual Autumn Conference, vol. 28, Nov. 20, 2018, PA-08.
Shin, Taehun et al., "High-performance Field Emitter of Multiwalled Carbon Nanotubes Grown by Varying Oxygen Gas Pressure Using Arc Discharge", IVNC, Jul. 9, 2018, p. 324.

\* cited by examiner

METHOD OF MANUFACTURING CARBON NANOTUBES USING ELECTRIC ARC DISCHARGE

TECHNICAL FILED

The present inventive concept relates to a method of manufacturing carbon nanotubes, and more particularly, to a method of manufacturing multi-walled carbon nanotubes using electric arc discharge.

BACKGROUND ART

Carbon nanotubes (CNTs) have a tubular structure composed of hexagons of carbon and have diameter of several nanometers and length of several tens of micrometers. CNTs have high aspect ratios because of their extremely large length-to-diameter ratios, high electrical conductivity, excellent thermal stability and chemical stability.

CNTs have walls made of graphitic sheets. According to the number of walls, they can be divided into single-walled, double-walled and multi-walled CNTs and be manufactured by various synthesis methods. Methods for synthesizing CNTs include electric arc discharge, laser vapor deposition and chemical vapor deposition.

The electric arc discharge method is a method of synthesizing CNTs using electric arc discharge. The electric arc discharge refers to a phenomenon occurring in currents over an abnormal discharge region and a phenomenon in which a large amount of current abruptly flows through a space between a cathode and an anode. When an electric arc discharge occurs, a high current flows and a heat is generated by electrical resistance at the cathode. Further, a large amount of thermal electrons are emitted from the cathode and flows into the anode. In a conventional arc discharge method, two graphite rods are used as a cathode and an anode. When a DC voltage is applied between the cathode and the anode, a large amount of electrons emitted from the cathode are discharged to the anode by electric fields. Electrons rushing to the anode collide with the graphite rod. The collisions cause carbon clusters to escape from the graphite rod, which are deposited on the surface of the cathode having a relatively low temperature. The deposits formed on the cathode surface include CNTs, amorphous carbon, and graphitic particles. The CNTs synthesized by the arc discharge method have multi-walls. Furthermore, single- or double-walled CNTs can be synthesized when a transition metal is added to the graphite anode electrode as a catalyst. The catalyst metal used is typically Co, Fe or Ni.

The chemical vapor deposition method is widely used as a technique capable of mass production of CNTs. Using chemical vapor deposition, furthermore, CNTs can be grown vertically oriented, at low temperature, with high purity and on large area substrates. The manufacturing process involves injecting a hydrocarbon gas and a metal catalyst into a reactor and decomposing the hydrocarbon gas using heat or plasma. The metal catalyst is helpful for decomposition of the hydrocarbon gas. The metal catalyst forms nuclei for the synthesis of CNTs. The catalyst used is a metal typically Co, Fe or Ni. The hydrocarbon gas used is acetylene ($C_2H_2$), ethylene ($C_2H_4$) or methane ($CH_4$).

A laser vapor deposition method utilizes a mixture in which transition metals and graphite powders are mixed at an appropriate ratio, and the mixture is used as the target. The target is irradiated with a laser to form CNTs through the vaporization and condensation. If the mixture is pure graphite in the laser vapor deposition, multi-walled CNTs (MW-CNTs) are formed, and when the transition metal is used as a catalyst, single-walled CNTs are formed.

In addition, CNTs can be applied to various fields according to their kinds and manufacturing methods. The chemical vapor deposition method is suitable to mass production, but when the gas flow rate is uneven in the reaction chamber, CNTs having uneven characteristics or shapes are synthesized. In addition, when the laser vapor deposition method is used, the CNTs having high purity can be obtained, but mass production is limited.

Also, in terms of applications, CNTs are used as materials for field emission of electrons. Application using field emission include X-ray tubes for CT (Computer Tomography), and CNTs are used as field emitters. In order to be used as emitters, CNTs need to have high crystallinity and structural straightness.

To ensure high crystallinity and structural straightness, CNTs should be synthesized at high temperature. High temperature synthesis means that the temperature at which the CNT synthesis is started should be high. For example, when a chemical vapor deposition method is used, CNTs having high crystallinity cannot be obtained due to a low synthesis temperature. Therefore, the arc discharge method with a high synthesis temperature is effective for synthesizing CNTs having a high crystallinity and a structural straightness. However, in the arc discharge method, the quality of the CNTs varies greatly depending on the kind of the gas used in the synthesis process, the gas pressure, and the arc discharge current. It would still be desirable to overcome this and to form CNTs with high crystallinity and structural straightness.

TECHNICAL PROBLEM

The present inventive concept is directed to providing a method for producing CNTs having high crystallinity and structural straightness.

TECHNICAL SOLUTION

One aspect of the present inventive concept provides a method of manufacturing CNTs, comprising: supplying a synthesis gas into a chamber in which a cathode and an anode are placed apart, and generating an electric arc discharge by applying a voltage between the cathode and the anode to synthesize CNTs on the cathode, wherein the synthesis gas includes nitrogen gas and oxygen gas.

ADVANTAGEOUS EFFECTS

According to the present inventive concept described above, MWCNTs having a high crystallinity and a high oxidation peak temperature can be obtained. In particular, the CNTs can be utilized as field emitters. The field emitters emit electrons upon application of a high voltage under a vacuum condition. During the emission of electrons, a large amount of current flows through the MWCNTs, which are emitters, and Joule heat is generated, thereby causing a high temperature to the CNTs. Also, the electric fields are concentrated at the ends of the CNT emitters, so that the electrostatic force acts strongly on them. In an environment of high temperature and strong electrostatic force, low crystallinity regions of CNTs can be damaged and cut. When a strong electric field is applied to the ends of the CNTs in a high temperature environment, the carbon atoms at the tube ends may evaporate and the CNTs may be damaged. When a small amount of oxidizing gas exists in a high temperature environment, CNTs having low oxidation peak temperatures can be easily oxidized and cannot act as the field emitters. In the present inventive concept, MWCNTs have high crystallinity and have a high oxidation peak temperature that can withstand such a high temperature environment.

In addition, high-quality CNTs can be obtained through low-cost synthesis gas using $N_2$ and $O_2$ gases.

It should be noted that effects of the present inventive concept are not limited to the above-described effects, and other effects of the present inventive concept not mentioned above can be clearly understood by those skilled in the art from the following descriptions.

DETAILED DESCRIPTION

Hereinafter, exemplary embodiments of the present inventive concept will be described in detail with reference to the accompanying drawings.

The exemplary embodiments of the present inventive concept may be modified in various other forms, and the scope of the present inventive concept is not limited to the exemplary embodiments described below. Further, these embodiments are provided to more fully describe the present inventive concept to those skilled in the art. Therefore, shapes and sizes of components in the drawings may be exaggerated for clarity, and components denoted by the same reference numerals in the drawings are the same components.

EMBODIMENT

Figure 1:
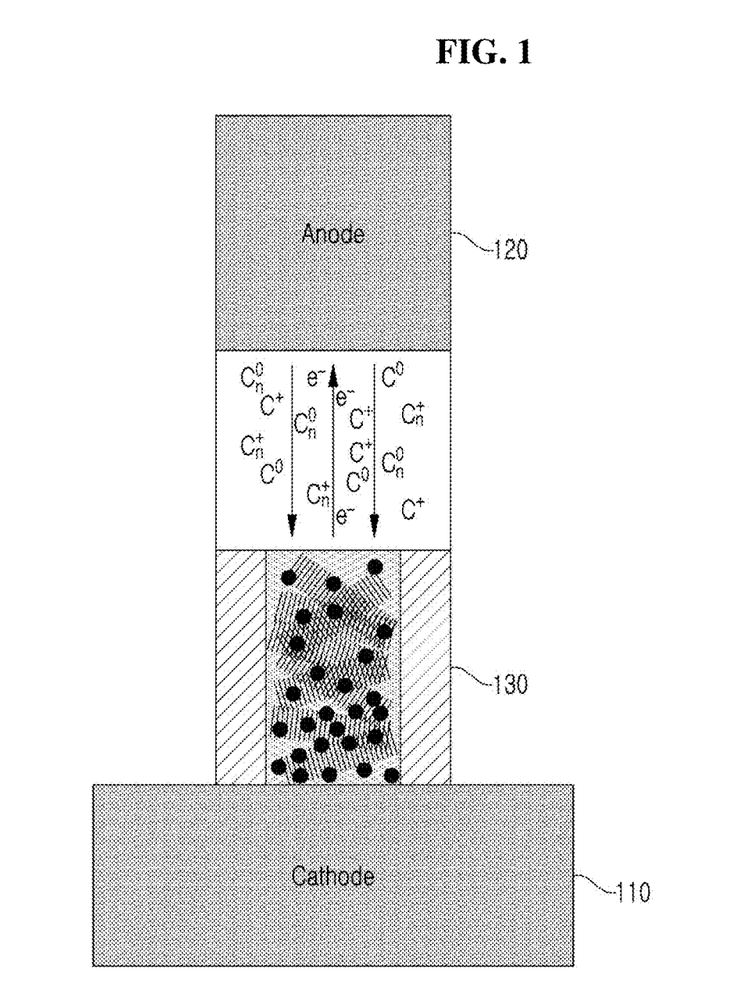
FIG. 1 is a schematic view to explain manufacturing CNTs according to a preferred embodiment of the present inventive concept.

FIG. 1 is a schematic view to explain manufacturing CNTs according to a preferred embodiment of the present inventive concept.

Referring to FIG. 1, a cathode 110 and an anode 120 are provided in a chamber.

The graphite used as the cathode 110 preferably has a cubic shape and is configured to synthesize CNTs on four surfaces of the graphite cube. Particularly, it is preferable to synthesize CNTs on one of the four surfaces of the graphite cube used as the cathode 110, then to terminate the CNT synthesis, and then to rotate to the next surface to synthesize the CNTs again. The graphite used for the cathode 110 is pure graphite G347 having an oxidation temperature of 735.3° C. and a crystalline evaluation index $I_G/I_D$ of 1.5. A He—Ne laser having a wavelength of 633 nm is used for the crystallization evaluation. $I_G$ in the crystalline evaluation index $I_G/I_D$ is the intensity of a peak that is generated around 1580 $cm^{-1}$ by an in-plane phonon mode with a momentum of zero at the Raman peak and is common in graphitic materials. $I_D$ is the intensity of a peak generated around 1350 $cm^{-1}$ when inelastic scattering by a phonon and elastic scattering around defects/substitutional points occur, and the intensity of the peak is larger as the number of defects increases. Therefore, it should be understood that the crystallinity of CNTs is higher as their crystalline evaluation index $I_G/I_D$ has a higher value.

Furthermore, an usual graphite or the same graphite as the cathode 110 is used as the anode 120. The diameter or cross-sectional area of the anode 120 may be smaller than the diameter or cross-sectional area of the cathode 110. A distance between the two electrodes is set to about 2 mm. Carbon may be continuously consumed at the anode 120 and then be continuously deposited at the cathode 110, so that the distance between anode 120 and CNT aggregate 130 may be varied. In order to prevent distance variation, the cathode 110 or anode 120 may be moved at a suitable rate so that the distance between the anode 110 and the CNT aggregate 130 is kept constant at about 2 mm.

The chamber in the vacuum state is fed with synthesis gas. The synthesis gas includes nitrogen gas ($N_2$) and oxygen gas ($O_2$). A voltage is applied between the cathode 110 and the anode 120 to generate an arc discharge in the synthesis gas ambient of $N_2$ and $O_2$. The electrons emitted due to the generated arc discharge collide with the anode surface, and carbon particles such as carbon atoms, carbon ions, carbon clusters or carbon cluster ions are generated from the anode 120. The carbon particles generated from the anode 120 move to the cathode 110 and are deposited on the surface of the cathode 110. Hence, the CNT aggregate 130 is formed on the surface of the cathode 110 by deposition of the carbon particles. That is, the MWCNTs are formed in the core region of the formed CNT aggregate 130, the formed MWCNTs emit electrons, the emitted electrons collide with the anode 120, and the generated carbon particles are again deposited on the CNT aggregate 130.

In the conventional case, an inert gas is used as the synthesis gas. In particular, He or Ar is used as the inert gas. However, in the present inventive concept, $N_2$ and $O_2$ are used as synthesis gas.

Furthermore, the synthesis gas contains $O_2$. The $O_2$ gas contained in the synthesis gas is activated due to electric fields and high temperature during the arc discharge. The $O_2$ gas can be activated by collision of electrons accelerated by electric fields in the arc discharge. Furthermore, in the arc discharge region, the temperature rises close to 3000° C., so that $O_2$ near the discharge region is activated at a very high temperature, producing reactive oxygen species. The reactive oxygen species reacts with the carbon having high free energy among the carbon particles deposited on the cathode 110, forming $CO_2$ gas, to prevent the formation of amorphous carbon. Thus, CNTs with high crystallinity can be synthesized. In addition, $O_2$ may be excluded from the synthesis gas. If the $O_2$ is excluded, the crystallinity of CNTs may be somewhat lowered. However, CNTs synthesized by arc discharge have higher crystallinity than CNTs produced by general CVD because temperature of carbon particles generated by arc discharge are as high as 3000° C.

In addition, an inert gas can be employed in place of $N_2$ in synthesis gas, but the inert gas has manufacturing disadvantages due to its high cost. Therefore, $N_2$ gas having high chemical stability and low cost is included in the synthesis gas.

Production Example 1: Manufacturing CNTs Using Synthesis Gas

Figure 2:
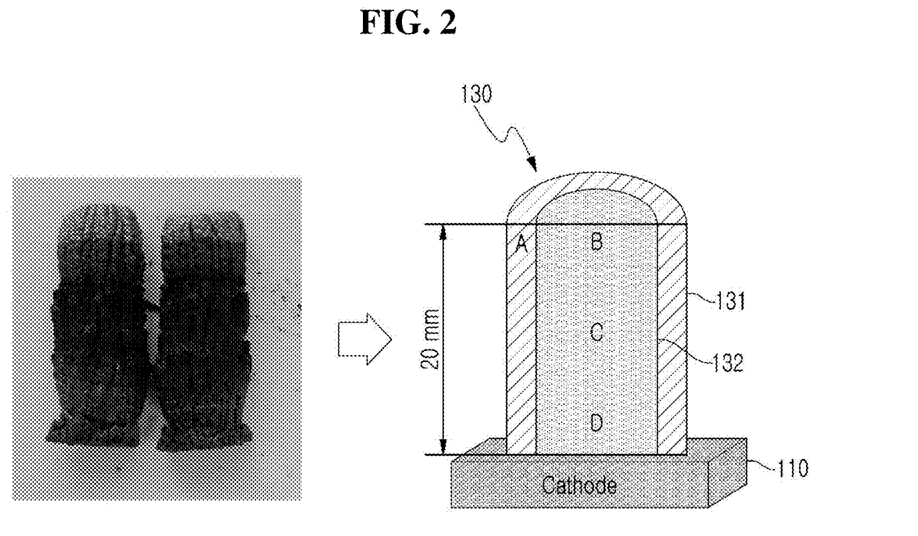
FIG. 2 is a digital camera image and a cross-sectional schematic view of a CNT aggregate manufactured according to Production Example 1 of the present inventive concept.

FIG. 2 is a digital camera image and a cross-sectional schematic view of CNT aggregate manufactured according to Production Example 1 of the present inventive concept.

Referring to FIG. 2, a pure graphite G347 rod having a length of 150 mm and a diameter of 8 mm is used as an anode, and a pure graphite G347 cube having a size of 100 mm×100 mm×100 mm is used as a cathode 110. The distance between the anode and the cathode 110 is kept constant at about 2 mm A voltage between both electrodes is set to 20V to 25V, and the arc discharge is generated in a constant current mode of 80 A. During the arc discharge, the synthesis gas contains $N_2$ and $O_2$, the partial pressure ratio of the supplied $N_2$ gas and the $O_2$ gas is 9:1, and the chamber pressure of 60 torr is maintained. Arc discharge synthesis of CNTs is performed for 10 minutes.

When an arc discharge is generated between both electrodes by a voltage applied as described, carbon particles produced from the anode are deposited on the surface of the cathode 110. Also, the CNT aggregate 130 is formed on the surface of the cathode 110 by deposition. The CNTs appear in the core region 132 of the CNT aggregate 130 and serve as a kind of cathode electrode capable of emitting electrons and generating an arc discharge with an anode. Accordingly, when the CNT aggregate 130 is formed, it should be understood that the described distance between the cathode 110 and the anode is the same as the distance between the end of the anode and the growth front of the CNT aggregate 130 formed on the cathode 110. The same applies hereinafter.

The formed CNT aggregate 130 has a length of 20 mm, a diameter of 8 mm, and a weight of 1754.6 mg. A hard shell region 131 is formed on the outer periphery of the soft core region 132. The hard shell region 131 has aggregates of carbon impurities such as amorphous carbon and has a lower concentration of CNTs than the core region 132. In addition, the CNTs are mainly formed in the soft core region 132 surrounded by the shell region 131. Accordingly, the core region 132 has a higher CNT concentration than the shell region 131. Most of the CNTs formed in the core region 132 are multi-walled.

Figure 3:
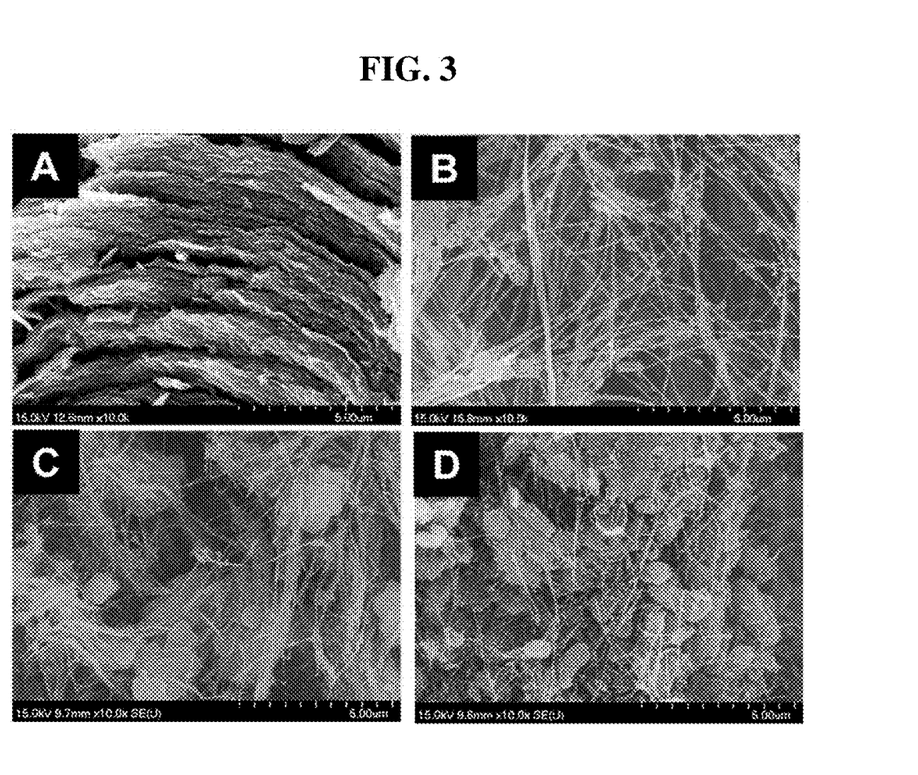
FIG. 3 is scanning electron microscopy (SEM) images of the CNT aggregate at the regions denoted in FIG. 2 according to Production Example 1 of the present inventive concept.

FIG. 3 is SEM images of the CNT aggregate at the regions denoted in FIG. 2 according to Production Example 1 of the present inventive concept.

Referring to FIG. 3, the manufactured CNT aggregate is cut, and samples are collected and photographed for each region.

The shell region of the CNT aggregate is denoted by "A", and amorphous carbon clusters are shown. At the shell region "A", the synthesized CNTs hardly appears.

In addition, the CNTs appear at the region "B", which is a growth front of the core region surrounded by the shell region. That is, CNTs appear in the core region. And, it can be seen that as the distance from the cathode surface increases, purity of the CNTs synthesized there increases. That is, a large amount of amorphous carbon clusters appear at the region "D", which is the core region closest to the cathode, and the CNTs are present in a small amount between the amorphous carbon clusters. In the region "C", which is a core region corresponding to half the distance between the growth front and the cathode surface, the CNTs have a higher purity than the region "D". In the region "C", the CNTs are mixed with the amorphous carbon clusters. Finally, a large amount of CNTs are present in the region "B", farthest from the cathode surface. The property characterization is performed using the CNTs in the region "B".

That is, the CNTs of the present inventive concept are preferably collected from the front region of the core region in the CNT aggregate. However, those skilled in the art are able to collect and use CNTs from all the core region regardless of distance from the cathode surface according to the types and specifications of the field emitters to be manufactured.

CNTs have high purity in the core region of the growth front. The CNTs at the front of the CNT aggregate are synthesized at a high temperature due to the arc discharge. However, the CNTs already formed at the lower region toward the cathode have a relatively low temperature. The carbon particles supplied from the anode are deposited on the already formed CNTs in the lower region having the low temperature, forming carbon impurities such as amorphous carbon. Therefore, CNTs having high purity are synthesized due to the high temperatures at the growth front of the CNT aggregate.

Comparative Example 1: Comparison CNTs Synthesized Under Inert Gas And Synthesis Gas FIG. 4 is a graph comparing the crystallinity of the CNTs in the Production Example 1 with that of CNTs manufactured in an inert gas condition.

Figure 4:
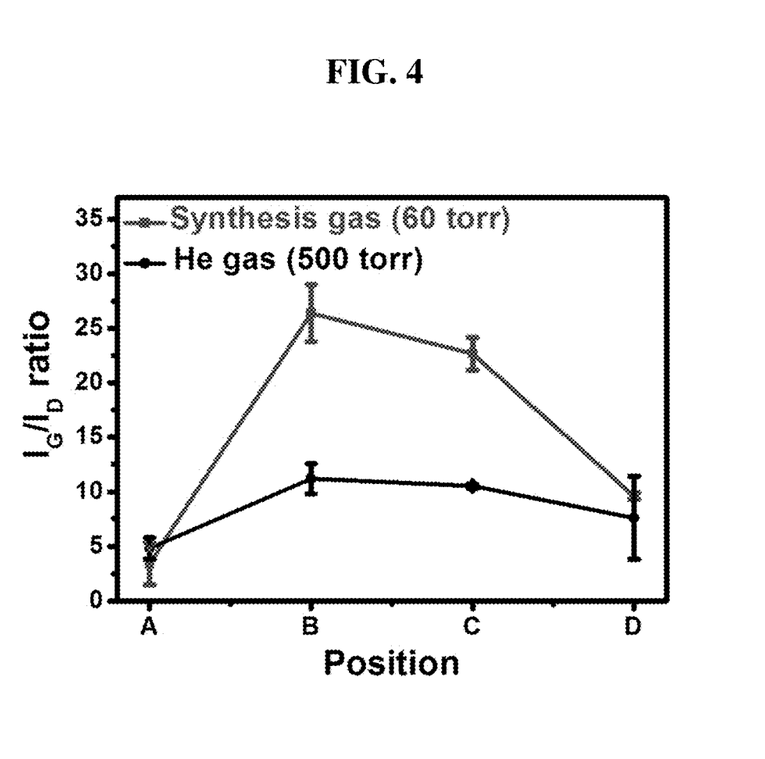
FIG. 4 is a graph comparing the crystallinity of the CNTs in the Production Example 1 with that of CNTs manufactured in an inert gas condition.

Referring to FIG. 4, the CNTs collected in the region "B" of Production Example 1 are compared with the CNTs prepared using He gas at 500 torr. The CNTs in the He gas atmosphere are manufactured at the same chamber as Production Example 1, and the CNTs are collected from the region "B" of the CNT aggregate manufactured using He gas.

Crystalline evaluation index $I_G/I_D$ of Raman spectra varies somewhat in repeated measurements. However, the CNTs synthesized under a synthesis gas containing $N_2$ and $O_2$ at 60 torr have a higher crystallinity in the region "B" than the other regions. The CNTs produced in the He gas atmosphere, which is an inert gas, exhibit relatively high crystallinity in the region "B" as compared with the other regions, but exhibit low crystallinity as compared with the CNTs synthesized under the synthesis gas having $N_2$ and $O_2$ gas. That is, the CNTs synthesized under the inert gas have much lower crystallinity than the CNTs synthesized in the synthesis gas at the core regions of "B", "C" and "D", even though they are produced under a high chamber pressure.

The property characterization is performed using the CNTs collected from the region "B" of the CNT aggregate of FIG. 2.

Figure 5:
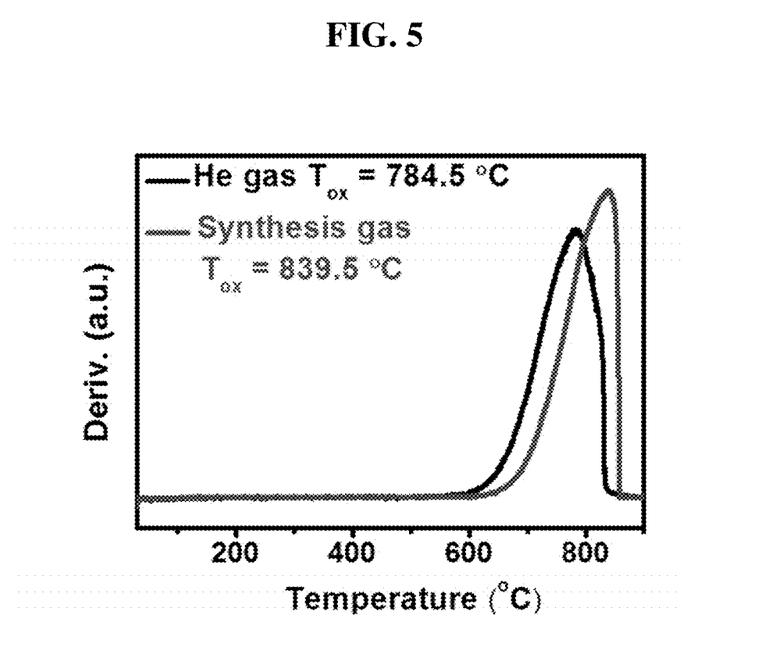
FIG. 5 is a graph comparing an oxidation peak temperature of CNTs manufactured in the synthesis gas with an oxidation peak temperature of CNTs manufactured in inert gas, both of which are collected from the region "B" of FIG. 4, according to Comparative Example 1.

FIG. 5 is a graph showing comparing oxidation peak temperature of CNTs manufactured in the synthesis gas with oxidation peak temperature of CNTs manufactured in inert gas, both of which are collected from the region "B" of FIG. 4, according to Comparative Example 1.

To acquire the oxidation peak temperature, thermogravimetric analysis (TGA) is performed by heating the CNT sample at a rate of 5° C. per minute while blowing air at 100 sccm. An oxidation peak temperature means a peak temperature in the first derivative curve of the TGA curve.

Referring to FIG. 5, the oxidation peak temperature $T_{ox}$ represents the temperature at which CNTs are most oxidized. When the CNTs have high crystallinity, the CNTs maintain a strong binding energy due to $sp^2$ bonding nature and become chemically stable. Therefore, when the CNTs have high crystallinity, their oxidation peak temperature $T_{ox}$ is higher.

In the FIG. 5, the CNTs formed at a pressure 500 torr of He gas shows the oxidation peak temperature $T_{ox}$ of 784.5° C. . The oxidation peak temperature $T_{ox}$ of the CNTs produced in the synthesis gas containing $N_2$ and $O_2$ is 839.5° C. Therefore, the CNTs produced using a synthesis gas containing $N_2$ and $O_2$ have higher crystallinity and thermal stability than those produced using an inert gas.

Production Example 2: Optimization Of Gas Pressure Condition For Synthesis Of CNTs Using Arc Discharge In Air FIG. 6 is SEM images showing CNTs manufactured by controlling the pressure of synthesis gas in a chamber according to Production Example 2 of the present inventive concept.

Figure 6:
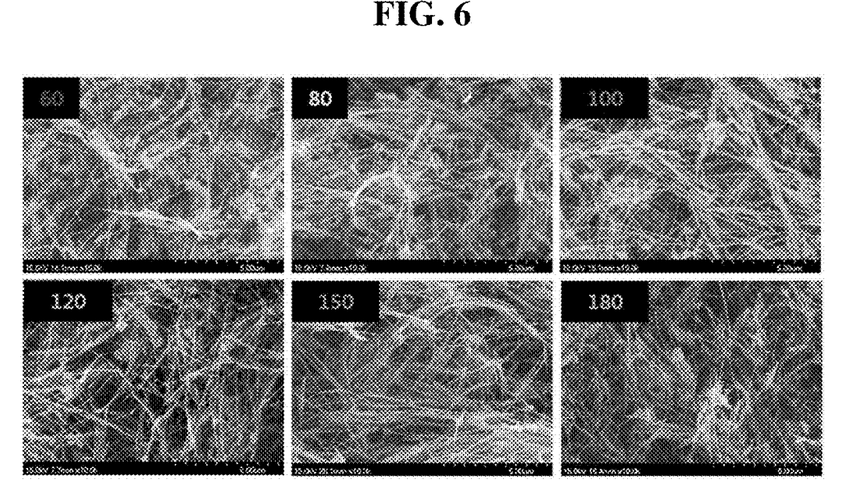
FIG. 6 is SEM images showing CNTs manufactured by controlling the pressure of the synthesis gas in a chamber according to Production Example 2 of the present inventive concept.

The CNTs shown in FIG. 6 are synthesized using the same graphite material for the cathode and the anode, and the same distance between both electrodes disclosed in FIG. 2. However, the chamber pressure of air is changed from 60 torr to 180 torr. In this production example, the crystallinity of the CNTs is evaluated according to the change of chamber pressure. Accordingly, it is possible to set an optimal chamber pressure in the present inventive concept.

Referring to FIG. 6, a pure graphite G347 rod having a length of 150 mm and a diameter of 8 mm is used as an anode, and a pure graphite G347 cube having a size of 100 mm×100 mm×100 mm is used as a cathode. The distance between the anode and the cathode is kept constant at about 2 mm.

The voltage between both electrodes is set to 20V to 25V, and the CNTs are synthesized using arc discharge in the constant current mode of 80 A. Air is used as the synthesis gas including $N_2$ gas and $O_2$ gas. Thus, the synthesis gas has a partial pressure of about 78% $N_2$ gas and a partial pressure of about 21% $O_2$ gas. In addition, the chamber pressure of air is set at 60 torr to 180 torr. With an increment of the synthesis gas pressure as much as 20 torr or 30 torr, the CNTs are synthesized by the arc discharge method. The synthesized CNTs are collected from the region "B" in FIG. 2. The CNT synthesis is performed for 10 minutes.

The CNTs of the image denoted as "60" are synthesized under a chamber pressure of 60 torr, and the respective images show the CNTs synthesized under the chamber pressures of the corresponding numbers. That is, the CNTs are synthesized at the chamber pressures of 60 torr, 80 torr, 100 torr, 120 torr, 150 torr and 180 torr according to the numbers denoted on the images. It can be seen from the images of FIG. 6 that the CNTs synthesized at 120 torr have the highest crystallinity, and when the chamber pressure exceeds 120 torr, the CNTs start to show low crystallinity due to a decrease in their structural straightness in the images.

Figure 7:
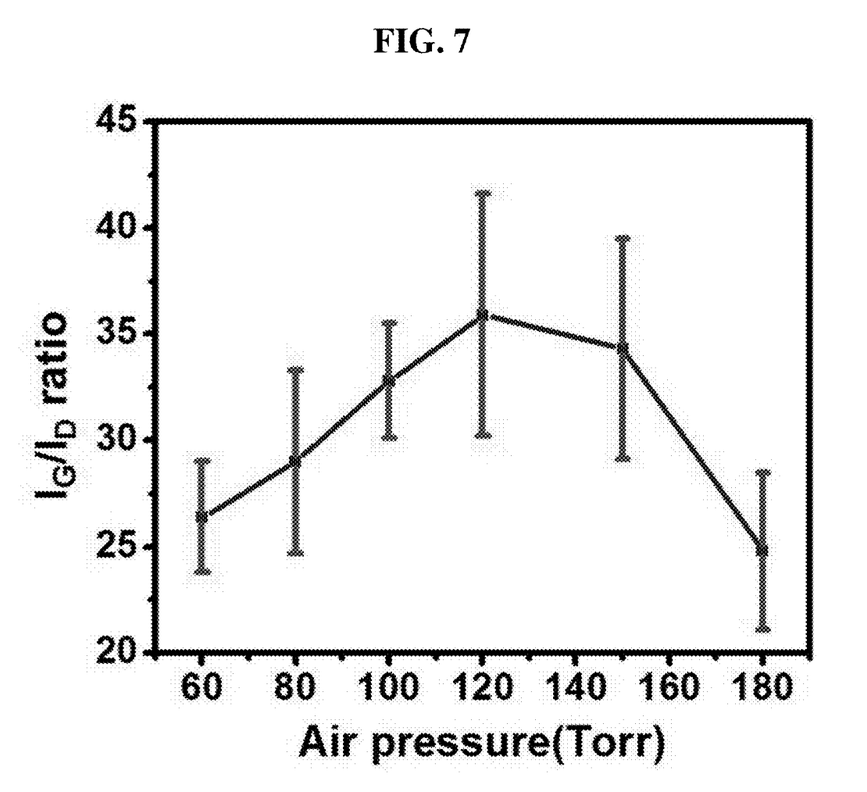
FIG. 7 is a graph showing crystalline evaluation index $I_G/I_D$ of CNTs of Production Example 2 of the present inventive concept.

FIG. 7 is a graph showing crystalline evaluation index $I_G/I_D$ of CNTs of Production Example 2 of the present inventive concept.

Referring to FIG. 7, since the crystalline evaluation index $I_G/I_D$ is a value measured based on the Raman spectrum, the index value varies for the repeated measurements of the Raman spectrum. For each of 6 kinds of CNTs, therefore, the crystalline evaluation index $I_G/I_D$ is expressed by an average value, and a standard deviation is also indicated by an error bar in FIG. 7. The crystalline evaluation index $I_G/I_D$ is 36.9±5.7 at the synthesis gas pressure of 120 torr. The crystalline evaluation index $I_G/I_D$ of the CNTs produced at 100 torr is 32.8±2.7, and the crystalline evaluation index $I_G/I_D$ of CNTs prepared at 150 torr shows a value of 34.3±5.2.

Therefore, in order to obtain CNTs having high crystallinity, the air pressure inside the chamber needs to be maintained at 100 torr to 150 torr.

In Production Example 2, the optimum chamber pressure is derived. The synthesis gas used in the present inventive concept is a gas composed of $N_2$ and $O_2$, and it can be confirmed that high quality CNTs can be produced by controlling the synthesis gas pressure of the present inventive concept.

Production Example 3: Optimization Of Partial Pressure Condition Of Synthesis Gas During Arc Discharge Synthesis Of CNTs FIG. 8 is SEM images showing CNTs manufactured by the arc discharge method while changing the partial pressure ratio of $N_2$ gas and $O_2$ gas forming the synthesis gas according to Production Example 3 of the present inventive concept.

Figure 8:
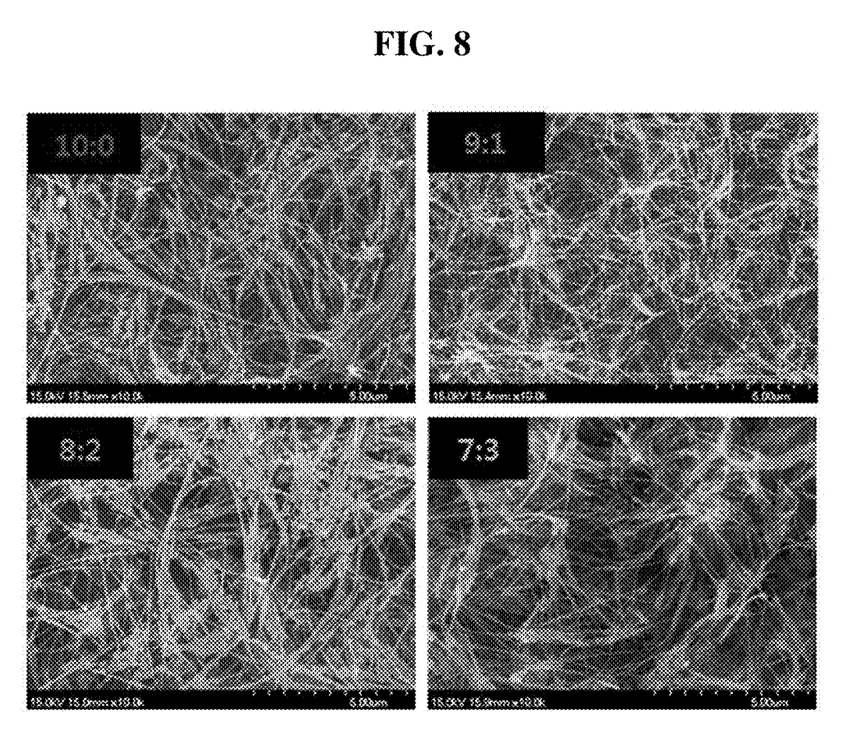
FIG. 8 is SEM images showing CNTs manufactured by the arc discharge method while changing an partial pressure ratio of nitrogen gas and oxygen gas forming the synthesis gas according to Production Example 3 of the present inventive concept.

Referring to FIG. 8, images show CNTs produced using a synthesis gas containing $N_2$ gas and $O_2$ gas. A pure graphite G347 rod having a length of 150 mm and a diameter of 8 mm is used as an anode, and a pure graphite G347 cube having a size of 100 mm×100 mm×100 mm is used as a cathode. The distance between the anode and the cathode is kept constant at about 2 mm.

The voltage between both electrodes is set to 20V to 25V, and the arc discharge synthesis of CNTs is performed for 10 minutes in the constant current mode of 80 A. In the arc discharge, the synthesis gas contains $N_2$ and $O_2$, and the CNTs are synthesized at the optimum pressure of 120 torr derived from Production Example 2. In addition, CNTs are collected from the region "B" of FIG. 2.

In FIG. 8, images of CNTs according to the partial pressure ratio of $N_2$ gas and $O_2$ gas are shown. That is, images of CNTs prepared at the partial pressure ratios between $N_2$ gas and $O_2$ gas of 10:0, 9:1, 8:2, and 7:3 are disclosed. Particularly, when the partial pressure ratio of $N_2$ gas and $O_2$ gas is 7:3, the degree of warping of the CNTs is large. At the other remaining partial pressure ratios, a large difference is not observed in the morphology of CNTs.

Figure 9:
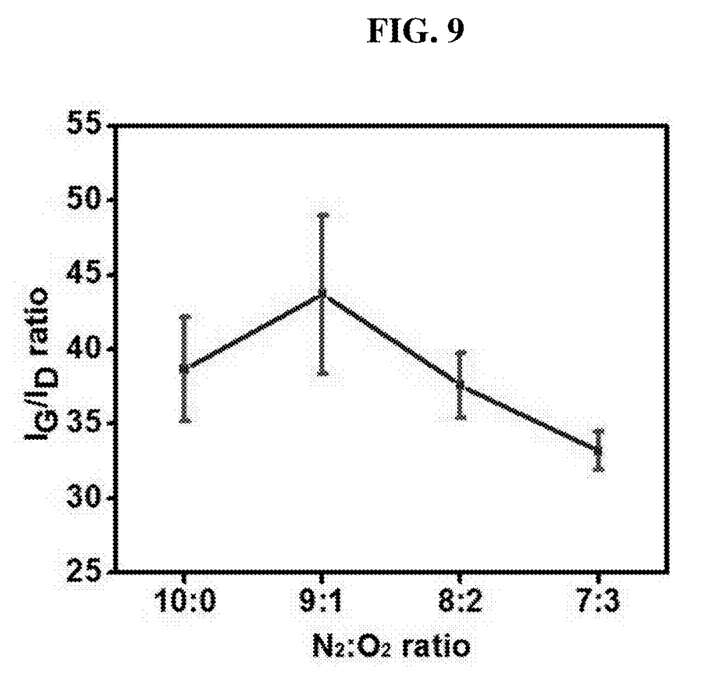
FIG. 9 is a graph showing crystalline evaluation index $I_G/I_D$ of CNTs as a function of the partial pressure ratio of nitrogen gas and oxygen gas according to Production Example 3 of the present inventive concept.

FIG. 9 is a graph showing crystalline evaluation index $I_G/I_D$ of CNTs as a function of the partial pressure ratio of $N_2$ gas and $O_2$ gas according to Production Example 3 of the present inventive concept.

Referring to FIG. 9, when the partial pressure ratio of $N_2$ gas and $O_2$ gas is 10:0, that is, when only the $N_2$ gas is used, the crystalline evaluation index $I_G/I_D$ has a value of 38.7±3.5. When the ratio is 9:1, the crystalline evaluation index $I_G/I_D$ is 43.7±5.3. That is, the crystalline evaluation index $I_G/I_D$ has a maximum value of 49 under the condition that the partial pressure ratio of $N_2$ gas to $O_2$ gas is 9:1. When the partial pressure ratio of $N_2$ to $O_2$ is 8:2, the crystalline evaluation index $I_G/I_D$ has a value of 37.6±2.2. When the partial pressure ratio is 7:3, the crystalline evaluation index $I_G/I_D$ has a value of 33.2±1.3.

That is, as the partial pressure ratio of $O_2$ gas gradually increases from 9:1, the crystalline evaluation index $I_G/I_D$ tends to be lowered.

Furthermore, when the partial pressure ratio of the $O_2$ gas is gradually decreased from 9:1, the area of the region "B" of FIG. 2 tends to be reduced, and the crystalline evaluation index $I_G/I_D$ also decreases.

That is, the CNTs produced at the $N_2$ gas and $O_2$ gas partial pressure ratio of 9:1 have the highest crystallinity.

Figure 10:
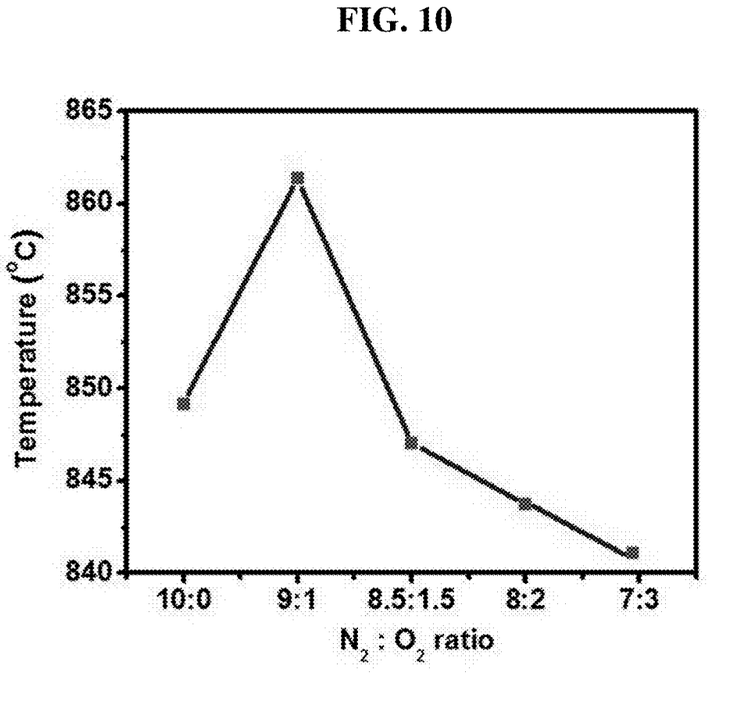
FIG. 10 is a graph showing oxidation peak temperature $T_{ox}$ of the CNTs of FIG. 8 according to Production Example 3 of the present inventive concept.

FIG. 10 is a graph showing oxidation peak temperature $T_{ox}$ of the CNTs of FIG. 8 according to Production Example 3 of the present inventive concept.

Referring to FIG. 10, the oxidation peak temperature $T_{ox}$ is measured for the CNTs produced depending on a partial pressure ratio of $N_2$ gas and $O_2$ gas ranging from 10:0 to 7:3. In particular, the oxidation peak temperature $T_{ox}$ of CNTs synthesized under the condition that the partial pressure ratio of $N_2$ gas and $O_2$ gas is 8.5:1.5 is added to supplement the graph.

When the partial pressure ratio of $N_2$ and $O_2$ is 9:1, the oxidation peak temperature is 861.4° C., which is the highest value in FIG. 10. In addition, the CNTs synthesized in a pure $N_2$ gas ambient at a partial pressure ratio of $N_2$ gas and $O_2$ gas of 10:0 shows that the oxidation peak temperature $T_{ox}$ decreases to 849.2° C. The CNTs synthesized at a $N_2$ gas and $O_2$ gas partial pressure ratio of 8:2 have an oxidation peak temperature $T_{ox}$ of 843.7° C.

Referring to FIG. 9 and FIG. 10, the tendency of the crystalline evaluation index $I_G/I_D$ and the trend of the oxidation peak temperature $T_{ox}$ in accordance with the partial pressure ratio of $N_2$ gas and $O_2$ gas coincide with each other. That is, in the condition that the partial pressure ratio of $N_2$ gas and $O_2$ gas is 9:1, the crystalline evaluation index $I_G/I_D$ does not only have the highest value but also the oxidation peak temperature $T_{ox}$ has the highest value. That is, the crystalline evaluation index $I_G/I_D$ and the oxidation peak temperature $T_{ox}$ exhibit the same characteristic behavior. This is because highly crystalline CNTs have high thermal stability due to $sp^2$ bonding nature. Therefore, the oxidation peak temperature $T_{ox}$, which is the temperature at which oxidation of CNTs is most active, also maintains a higher value when the crystalline evaluation index $I_G/I_D$ is higher.

Furthermore, when the partial pressure ratio of $O_2$ gas is reduced from 9:1, the crystalline evaluation index $I_G/I_D$ and the oxidation peak temperature $T_{ox}$ also decrease. This is presumably because the amorphous carbon produced by the arc discharge cannot be sufficiently removed if the amount of reactive oxygen species generated by the arc discharge is reduced. That is, when the partial pressure of $O_2$ gas is excessively decreased, the amount of reactive oxygen species or oxygen ions, which are chemical reactants capable of reacting with carbon particles, is reduced, and the formation of amorphous carbon is not prevented.

Furthermore, if the partial pressure ratio of the $O_2$ gas is completely decreased and the synthesis gas is formed only by the pure $N_2$ gas, the CNTs with high crystallinity cannot be formed. In particular, it becomes difficult to secure the region with the highest crystallinity or purity in FIG. 2.

Also, when the partial pressure ratio of $O_2$ gas is increased from 9:1, the concentration of reactive oxygen species increases, and the reactive oxygen species and the like react with crystalline carbon structures besides amorphous carbon, thereby damaging the CNTs and deteriorating the crystallinity of the CNTs.

Furthermore, in order that the MWCNTs synthesized by the arc discharge method can be used as field emitters, it is required for the CNTs to have a high oxidation peak temperature $T_{ox}$ of 850° C. or more. Therefore, it is preferable that the partial pressure ratio of $N_2$ gas and $O_2$ gas for the arc discharge synthesis of CNTs has a range of 9.5:0.5 to 8.7:1.3.

This is due to the chamber pressure being set to 120 torr. That is, when the chamber pressure is 120 torr, the CNTs to be produced has the highest crystallinity and the required gas pressure is set to 100 torr to 150 torr. If the gas pressure inside the chamber is less than 100 torr, the crystalline evaluation index $I_G/I_D$ is reduced to less than 30 and the oxidation peak temperature $T_{ox}$ is less than 850° C. Further, even when the chamber pressure exceeds 150 torr, the crystalline evaluation index $I_G/I_D$ is reduced to less than 30 and the desired oxidation peak temperature $T_{ox}$ cannot be obtained.

Accordingly, in the present inventive concept, MWCNTs are synthesized by an arc discharge method, and a synthesis gas of $N_2$ and $O_2$ is used as an ambient gas to be supplied into the chamber during the synthesis process. The partial pressure ratio of $N_2$ gas and $O_2$ gas in the synthesis gas is maintained at 9.5:0.5 to 8.7:1.3. The chamber pressure of the synthesis gas is set at 100 torr to 150 torr.

Production Example 4: Optimization Of The Pressure Condition Under The Condition That The Partial Pressure Ratio Of The Synthesis Gas In The Chamber Is Fixed When Performing The Arc Discharge Synthesis Of CNTs FIG. 11 is a graph showing crystalline evaluation index $I_G/I_D$ of the CNTs manufactured according to the synthesis gas pressure while the partial pressure ratio of $N_2$ gas and $O_2$ gas constituting the synthesis gas is fixed at 9:1.

Figure 11:
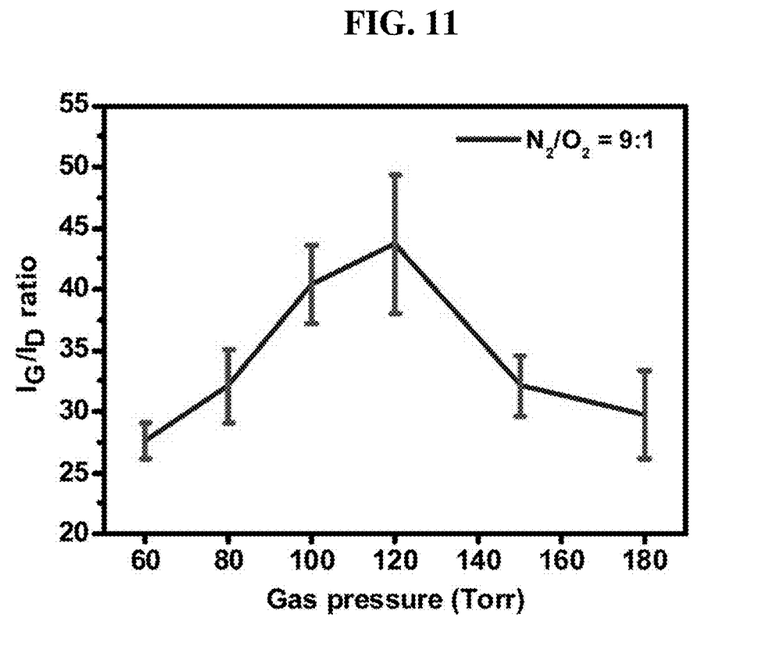
FIG. 11 is a graph showing crystalline evaluation index $I_G/I_D$ of CNTs manufactured according to the synthesis gas pressure while the partial pressure ratio of nitrogen gas and oxygen gas constituting the synthesis gas is fixed at 9:1.

Referring to FIG. 11, the CNTs are synthesized using the same electrode material as those of the anode and cathode described in FIG. 2, and the distance between both electrodes is the same with the Production Example 1. However, the chamber pressure is changed from 60 torr to 180 torr. In this Production Example, the crystallinity of the CNTs is evaluated according to the change in pressure. Accordingly, it is possible to set an optimal chamber pressure in the present inventive concept.

A pure graphite G347 rod having a length of 150 mm and a diameter of 8 mm is used as an anode, and a pure graphite G347 cube having a size of 100 mm×100 mm×100 mm is used as a cathode. The distance between the anode and the cathode is kept constant at about 2 mm The voltage between both electrodes is set to 20V to 25V, and the arc discharge is performed in the constant current mode of 80 A. During the arc discharge, the synthesis gas consists of $N_2$ gas and $O_2$ gas and has a partial pressure ratio of 9:1. In addition, the gas pressure of the chamber in which the synthesis gas is supplied is set at 60 torr to 180 torr. The synthesis gas pressure is increased by an increment of 20 torr or 30 torr, and the CNTs are synthesized by the arc discharge method. The arc discharge synthesis of CNTs at each pressure is performed for 10 minutes. The synthesized CNTs are collected from the region "B" in FIG. 2.

For each of the six kinds of CNTs produced, the crystalline evaluation index $I_G/I_D$ show some variation in the repeated measurements of Raman spectra. Therefore, the crystalline evaluation index $I_G/I_D$ is expressed by an average value and a standard deviation. The crystalline evaluation index $I_G/I_D$ is 43.7±5.7 at a pressure of 120 torr in the chamber where the synthesis gas is supplied, the crystalline evaluation index $I_G/I_D$ of the CNTs prepared at 80 torr is 32.4±3.0, and the crystalline evaluation index $I_G/I_D$ of CNTs prepared at 150 torr shows a value of 32.1±2.5.

Therefore, in order to obtain CNTs having high crystallinity, the gas pressure inside the chamber needs to be maintained at 80 torr to 150 torr under the condition that the partial pressure ratio of $N_2$ gas and $O_2$ gas is 9:1.

According to the present inventive concept, the CNTs synthesized by the arc discharge method have high crystallinity and high oxidation peak temperature. To achieve these characteristics, it is required that the synthesis gas in the chamber has a certain range of the partial pressure ratio of the $N_2$ gas and the $O_2$ gas. It also needs to set a chamber pressure at 100 torr to 150 torr.

Thus, MWCNTs having a high crystallinity may be synthesized and a high oxidation peak temperature can be obtained. In particular, the MWCNTs can be utilized as electron emitters for field emission devices. The field emitters emit electrons by applying a high voltage under a vacuum condition. At operation of field emission, the electric field is concentrated at the ends of the MWCNTs, which are emitters, and a high-temperature environment is created. Therefore, when the MWCNTs have a low oxidation peak temperature, oxidation is initiated from the weak points or ends of the MWCNTs and the field emission function cannot be performed. In the present inventive concept, MWCNTs having a high oxidation peak temperature that can withstand high temperatures can be obtained.

The invention claimed is:

1. A method of manufacturing carbon nanotubes (CNTs), comprising:

supplying a synthesis gas composed of only $N_2$ gas and $O_2$ gas into a chamber, in a vacuum state, in which a cathode and an anode are placed apart; and generating an electric arc discharge by applying a voltage between the cathode and the anode within the synthesis gas to synthesize a CNT aggregate composed of a core region and a shell region on the cathode; and collecting the CNTs from a front region of the core region in the CNT aggregate.

2. The method of manufacturing the CNTs of claim 1, wherein the partial pressure ratio of the $N_2$ gas and the $O_2$ gas in the synthesis gas is 9.5:0.5 to 8.7:1.3.

3. The method of manufacturing the CNTs of claim 1, wherein a cross-sectional area of the anode is smaller than a cross-sectional area of the cathode.

4. The method of manufacturing the CNTs of claim 1, wherein a chamber pressure is from 80 ton to 150 torr.

5. The method of manufacturing the CNTs of claim 1, wherein the CNTs have an oxidation peak temperature of 850° C. or more.

6. The method of manufacturing the CNTs of claim 1, wherein the CNTs have a crystalline evaluation index IG/ID of 30 to 49.

7. The method of manufacturing the CNTs of claim 1, wherein the synthesis of the CNT aggregate on the cathode comprises: generating electrons by the arc discharge to collide with the anode; and forming the CNT aggregate by migration of carbon particles generated by electron collision at the anode and by deposition of the carbon particles on the cathode.

8. The method of manufacturing the CNTs of claim 7, wherein the CNT aggregate has the shell region in which an amorphous carbon has high concentration and the CNTs have low concentration, and the core region in which an amorphous carbon has lower concentration and the CNTs have higher concentration than the shell region enclosing the core region.

9. The method of manufacturing the CNTs of claim 7, wherein the CNTs have high crystallinity at the front region of the CNT aggregate located farthest from a surface of the cathode.

10. The method of manufacturing the CNTs of claim 7, wherein the CNTs at the front region of the CNT aggregate discharge electrons to the anode by the arc discharge, and the CNTs are deposited in high purity at the front region of the CNT aggregate.

11. The method of manufacturing the CNTs of claim 10, wherein the front region of the CNT aggregate and the anode maintain a constant distance.

* * * * *